United States Patent

Miyashiro

[15] 3,668,473

[45] June 6, 1972

[54] PHOTOSENSITIVE SEMI-CONDUCTOR DEVICE

[72] Inventor: Shoichi Miyashiro, Yokohama, Japan

[73] Assignee: Tokyo Shibaura Electric Co., Ltd., Kawasaki-shi, Japan

[22] Filed: June 23, 1970

[21] Appl. No.: 49,006

[30] Foreign Application Priority Data

June 24, 1969 Japan ..............................44/49369
July 29, 1969 Japan ..............................44/58028

[52] U.S. Cl. ................317/234 R, 317/235 N, 317/235 AG, 317/235 NA

[51] Int. Cl. ..........................................................H01l 15/00

[58] Field of Search .................317/235 N, 235 NA, 235 AT, 317/235 AC, 238

[56] References Cited

UNITED STATES PATENTS 3,440,476 4/1969 Crowell ..................................315/10
3,467,880 9/1969 Crowell ..................................315/11
3,574,143 4/1971 Vratny ..................................252/520
3,419,746 12/1968 Crowell ..................................315/10

*Primary Examiner*—John W. Huckert
*Assistant Examiner*—Martin H. Edlow
*Attorney*—Flynn & Frishauf

[57] ABSTRACT

A photosensitive semi-conductor device for use as a target of camera tubes. It has a semi-insulating layer formed on that side of a semi-conductor substrate which is impinged by light photons or energetic electrons. The semi-insulating layer is charged in accordance with the incident light photons or energetic electrons, and the electric field set up across the semi-insulating coating layer by the bombardment of light photons and energetic electrons has an effect of controlling the motion of minority carriers to automatically control the input-output photoelectric conversion gain of the photosensitive semi-conductor device.

8 Claims, 13 Drawing Figures

PHOTOSENSITIVE SEMI-CONDUCTOR DEVICE

This invention relates to semi-conductor devices sensitive to energetic particles such as light photons or radioactive rays.

It is well known in the art that the semi-conductor element sensitive to light photons or radioactive rays is used as the target of camera tubes. The single crystal of such semiconductor as silicon (Si) and germanium (Ge) has a very low resistivity, so that it can not provide sufficient charge-storing effect nor resolution as required for the target of camera tubes. Therefore, it can not be directly used for the target. The semi-conductor element used for the target is usually formed with p-n junctions in a single-crystalline semi-conductor substrate to utilize the reverse characteristics of the p-n junctions so as to provide for the required charge-storing effect. Also, the p-n junctions are spaced in a mosaic form to reduce leakage of the stored charge so as to provide for the required resolution.

However, with the target of the above type the amount of charge stored in the target increases in proportion to the intensity of input to the camera tube, and hence input to the target, so that for a highly bright object pictured the amount of charge stored in the target is too large to be completely discharged by the scanning electron beam. In other words, the amount of electrons in the scanning electron beam is likely to be insufficient for neutralizing the stored charge corresponding to a highly bright object. This results in extreme disturbances in the picture signal output. Even if sufficient electrons for discharging the stored charge are available in the scanning electron beam, an output picture signal of an extremely large amplitude is generated for a highly bright part of the picked-up image to bring about saturation of the amplifying circuit, thus resulting in an extreme distortion of the output picture.

This prior art device has further drawbacks that where a foreground object has a very bright portion, there will occur relation around said bright portion in reproducing the image of the foreground object, and there will be lost distinct contrast, resulting in the reduced distinguishing capacity of a camera tube.

Thus, the conventional camera tube having target using the semiconductor element of the aforementioned type, can not have the picking-up capacity for an object, whose brightness is higher than a predetermined value, and the light intensity in its use is disadvantageously restricted to a narrow range.

An object of the invention is to provide a photon- or electron-sensitive semiconductor device, wherein the input-output photoelectric conversion gain is automatically controlled in accordance with the amount of input.

According to the invention, there is provided a photon- or electron-sensitive semiconductor device for use as the target, which is provided with at least one semi-insulating layer on the side of a semi-conductor substrate, on which light photons or energetic electrons impinge. With this structure, the semi-insulating layer is charged in accordance with the amount (input amount) of light photons or energetic electrons incident thereon to superimpose a corresponding electric field thereacross, which has an effect of controlling the motion of electron-hole pairs simultaneously produced in the semi-conductor substrate by the light photon or energetic electron bombardment in accordance with the input amount, thereby automatically controlling the input-output photoelectric conversion gain of the target.

This invention can be more fully understood from the following detailed description when taken in connection with reference to the accompanying drawings, in which.

Figure 1:
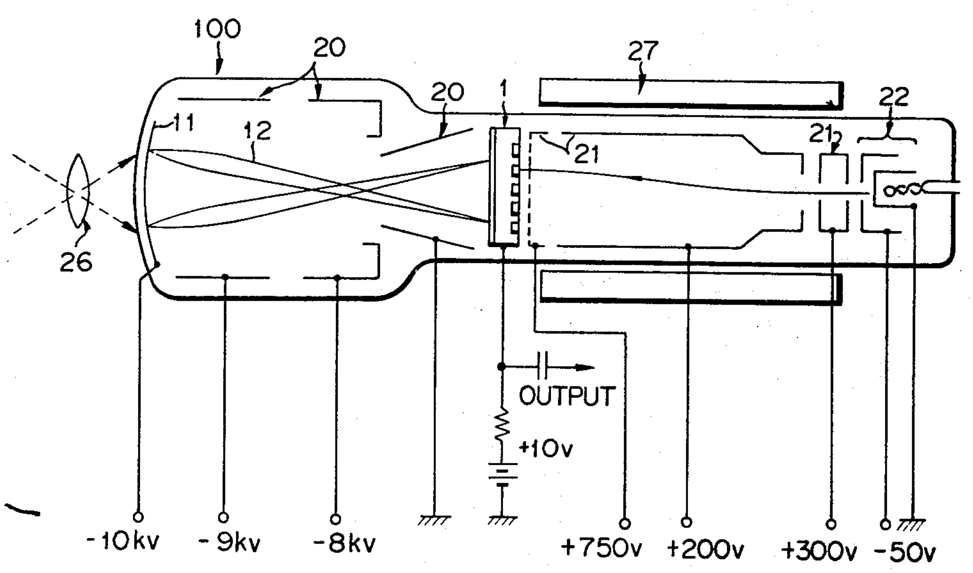
FIG. 1 is a schematic longitudinal section of a camera tube having a target using a photon- or electron-sensitive semi-conductor device embodying the invention.

FIG. 1 shows a photosensitive semi-conductor device according to the invention as applied to the target of a television camera tube. There is shown an evacuated tube envelope 100 having a photo-cathode 11 provided at the front end thereof. When an optical image is focused on the photo-cathode 11 through an optical system 26, photoelectrons are emitted in accordance with the brightness or light intensity of each element of the focused image. The photoelectrons 12 are focused on a target 1 through an electrostatic lens established by a group of electrodes 20. The target 1 takes role of stable electron amplification and charge storage to be described hereinafter. The charge image stored in the target 1 is scanned by an electron beam 14 shot from an electron gun 22 and deflected and focused by an electrode group 21 and an electromagnetic coil assembly 27, thereby deriving picture signal from the target substrate.

Figure 2:
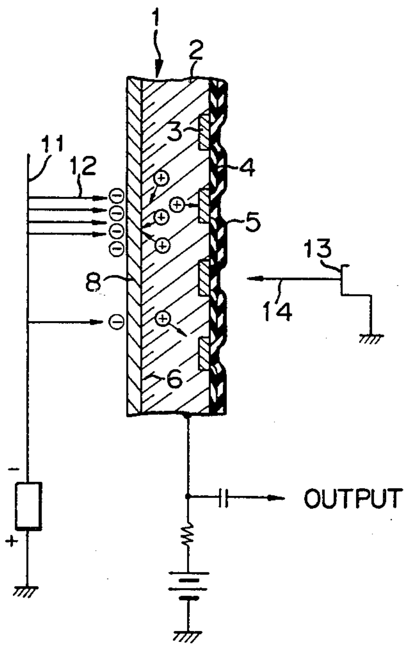
FIG. 2 is a schematic sectional view showing the construction of the target of FIG. 1.

FIG. 2 shows the target 1 of FIG. 1 in detail. It comprises an n-type silicon substrate 2 provided on the scanning side thereof with a coating film 4 of silicon dioxide ($SiO_2$), for instance. The film 4 is formed with a plurality of small holes spaced in a matrix form at a pitch of 25 $\mu$m, through which boron is diffused to a depth of 2 $\mu$m into the substrate to form numerous p-type island regions 3 arranged in a mosaic form. The surface of the p-type regions 3 and the silicon dioxide film 4 is covered with a thin film 5 of a slightly conductive, high-resistivity material, for instance antimony triselenide ($Sb_2Se_3$). An $n^+$-type, if desired, is formed in the n-type silicon substrate 3 on the side opposite the scanning side, that is, the input side, by diffusing phosphorus to a depth of about 1 $\mu$m into the substrate. On the input side surface of the substrate 3 is formed a semi-insulating layer 8 having a high specific resistivity (of the order of $10^5$ to $10^{12}$ ohm-cm). This is made by means of, for instance, the vacuum deposition technique using a mixture of yttrium oxide ($Y_2O_3$) and titanium oxide ($TiO_2$) as the deposition source. The time constant $\tau$ for the surface of the semi-insulating layer 8, that is the product of the impedance $R$ of the surface with respect to the silicon substrate 2 ($R = \rho d$; $R$: resistance per unit area, $d$: thickness of the semi-insulating film 8; $\rho$ : resistivity thereon) and the capacitance $C$ of the layer 8 ($C = \zeta/4\pi d$ ; $C$: capacitance per unit area, $\zeta$ : dielectric constant for the layer 8), (in this example $$\tau = \frac{1.1\times10^{-12}}{4\pi}\epsilon\rho\Big),$$

is preset to a desired value, for instance equal to one frame period. Also, the film 8 should be as thin as possible to minimize the effect of interfering the intrusion of photoelectrons into the silicon substrate 2. The n-type silicon substrate 2 of the target 1 is held at a positive potential of, for instance, 10 volts with respect to the electron gun cathode 13. When the target 1 is scanned with electron beam 14, that is, when the target 1 is subjected to the so-called low-speed electron-beam scanning, the potential of the p-type regions 3 is reduced to the cathode potential, so that the p-n junctions are reversely biased. When energetic photoelectrons 12 strike the target 1 in this state, many electron-hole pairs are produced in the n-type silicon substrate 2 to reduce the bias voltage thus built up in accordance with the input amount, and the re-scanning of the target 1 with the electron beam yields a highly amplified output picture signal.

The operation just described is the same as that of the aforementioned conventional semi-conductor target without any semi-insulating layer on the input side. According to the invention, the presence of the semi-insulating layer on the input side of the target provides a unique effect to be described hereinafter.

When there is a highly bright object in the televised scene, a correspondingly large number of electrons strike a corresponding portion of the target 1. Since the high resistivity layer consists of the material which emits secondary electrons at an efficiency of less than 1, in this example, the corresponding portion of the surface of the semi-insulating layer 8 on the input side of the target 1 is then negatively charged in accordance with the amount of the incident photoelectrons. As a result, a potential gradient tending to counter the n-type conductivity is superimposed in the surface layer of the n-type silicon substrate 2 adjacent the semi-insulating layer 8 in the proximity of the aforesaid portion of the surface of the semi-insulating layer 8. In other words, an internal electric field tending to prevent holes, which are minority carriers and are produced in the vicinity of the surface layer, from going toward the scanning side and pull then back toward the input side is superimposed. This phenomenon reduces the efficiency of the contribution of the minority carriers produced in the substrate portion, in which the superimposed field is present, to the output signal current.

Figure 3:
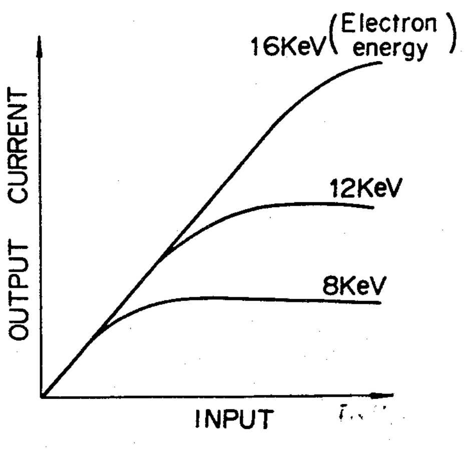
FIG. 3 is a graph showing the input-output characteristic of the target of FIG. 2.

The brighter the object, the less is the increment of the output signal, and the output current is saturated when the input brightness exceeds a certain value. The input-output characteristic of the target just described is shown in FIG. 3. It will be apparent from the Figure that the lower the energy of the incedent photoelectrons the less input intensity is required to cause saturation. This is because of the fact that the lower the energy of the incedent electron, the shallower is the spot, at which the electron-hole pair is produced, and the more strongly affected are the produced carriers by the superimposed electric field.

As is described, with the target using the photosensitive semi-conductor device according to the invention the aforementioned disadvantage inherent to the conventional camera tube is obviated, and the photoelectric conversion characteristic of the camera tube may be widely improved. In other words, if there is an excessively bright object in the televised scene, the output signal corresponding to the bright portion is supressed to some extent, so that always a stabilized picture signal may be produced. This means an increased input intensity range, for example light intensity range, over which the camera tube can stably operable. It will be appreciated that the time constant for the surface of the semi-insulating layer is arranged to coincide with one frame period for example, because with this arrangement the charging and discharging of the surface of the semi-insulating film can follow the variation of the illumination intensity of the televised scene, and other arrangements may be available in other case.

Though in the foregoing embodiment a mixture of yttrium oxide ($Y_2O_3$) and titanium oxide ($TiO_2$) is used as the material of the semi-insulating film, other materials such as cadmium telluride (CdTe), arsenic sulfide ($AsS_3$), antimony sulfide ($SbS_3$), etc., may also be used either individually or in combination.

Figure 4:
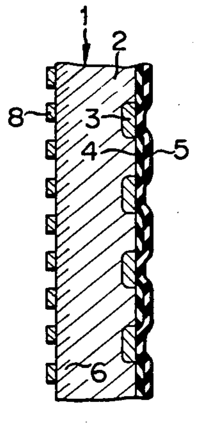
FIGS. 4 to 6, 9 and 11 are fragmentary sectional views showing respective modifications of the target construction shown in FIG. 2.
Figure 5:
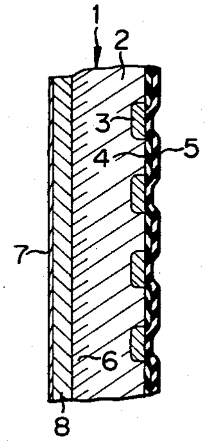
Figure 6:
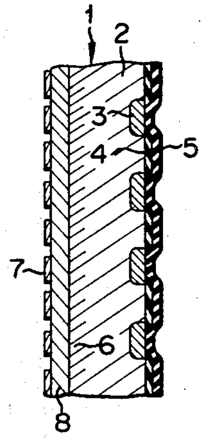

FIGS. 4 to 6 show other embodiments of the semi-conductor target. In the target of FIG. 4, the substrate 2 is not completely covered on the input side thereof with the semi-insulating film 8, but it is partially exposed by forming many holes in the film 8. For example, the semi-insulating film may be formed into a layer of a large number of divided islands or a meshed formation. This arrangement can facilitate the intrusion of photoelectrons into the silicon substrate without spoiling the aforedescribed electric field effect, so that the sensitivity to the low input may be improved.

In the semi-conductor target of FIG. 5, the semi-insulating film 8 is covered with a further thin film 7 of a suitable material providing the desired secondary emission efficiency, for instance porous zinc sulfide (ZnS), porous arsenic sulfide ($AsS_3$), porous antimony sulfide ($Sb_2S_3$), etc., to regulate the amount of charge on the semi-insulating film 8. If the thin film 7 is made of a material offering a high creeping resistance and having a low light transmission coefficient, such as carbon, stray light transmitted through the photo-cathode 11 may be prevented from intruding into the n-type semiconductor substrate. Also, to eliminate the effect of the stray light on the output signal the semi-insulating film 8 itself may be made of a material having a low light transmission coefficient. Though it is known that the end of sheltering the stray light is achieved by forming a thin metal film on the semi-insulating film 8, such metal film should be arranged in the form of dots or islands as shown in FIG. 6 to provide the creeping resistance (the resistance of the lateral direction of the surface). Further, it is known that the degradation of the sensitivity of the n-type semi-conductor substrate that results when fabricating the photo-cathode 11 as a result of the exposure of the n-type semi-conductor substrate to the deposition material such as cesium may be prevented by covering the signal input side of the n-type semi-conductor substrate, on which light photons or energetic electrons are incident, with a coating of such substance as oxides, nitrides, sulfides, selenides, etc. A more excellent sensitivity will be obtained if the semi-insulating film 8 and/or the thin film 7 thereon are/is made of these substances.

Figures 7A, 7B, 7C:
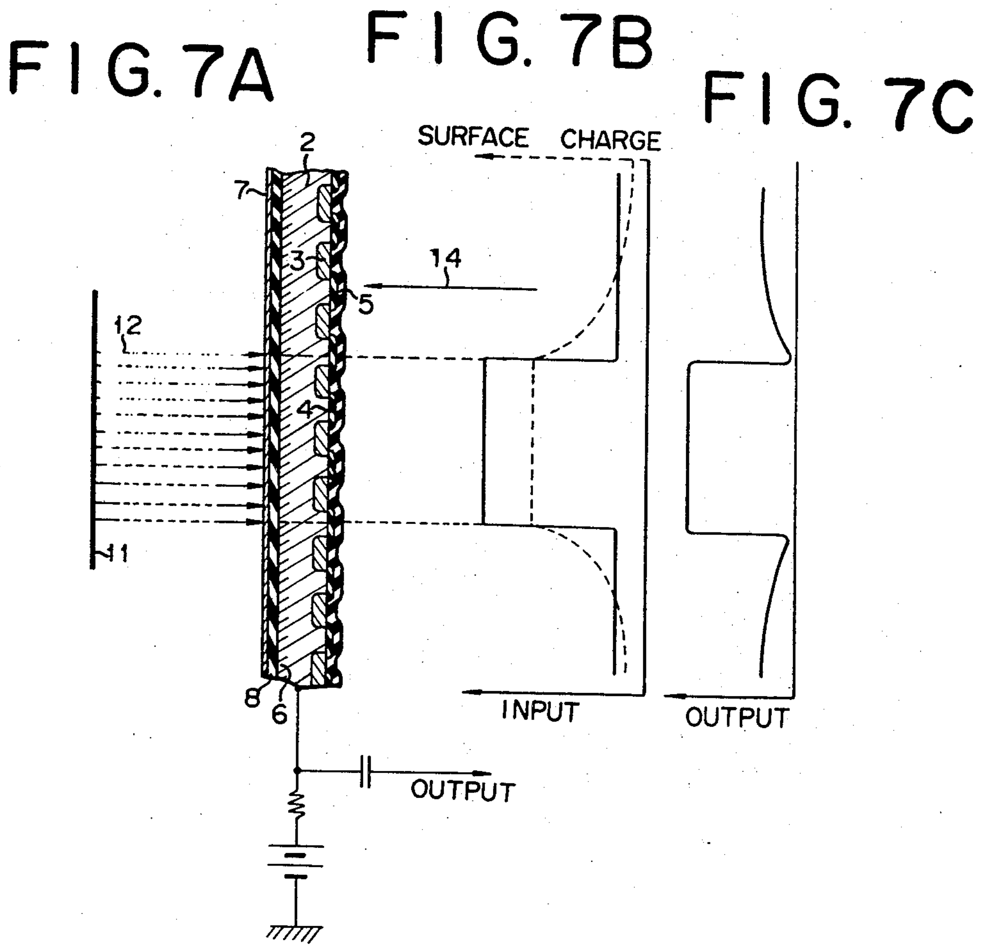
FIGS. 7A, 7B and 7C show a further embodiment of the target and the operation thereof according to the invention.

FIGS. 7A, 7B and 7C illustrate the operation of the semiconductor target according to the invention. The target construction shown in FIG. 7A is the same as that of the embodiment of FIG. 5. In the target of FIG. 7A, the thin film 7 is formed by depositing a material having a resistivity slightly lower than that of the high-resistivity film 8, for instance semiconductor material such as silicon, germanium, to the thickness of about 100 angstroms. This provides a unique effect, which the other previous embodiments can not provide, and which will now be described.

Figure 8:
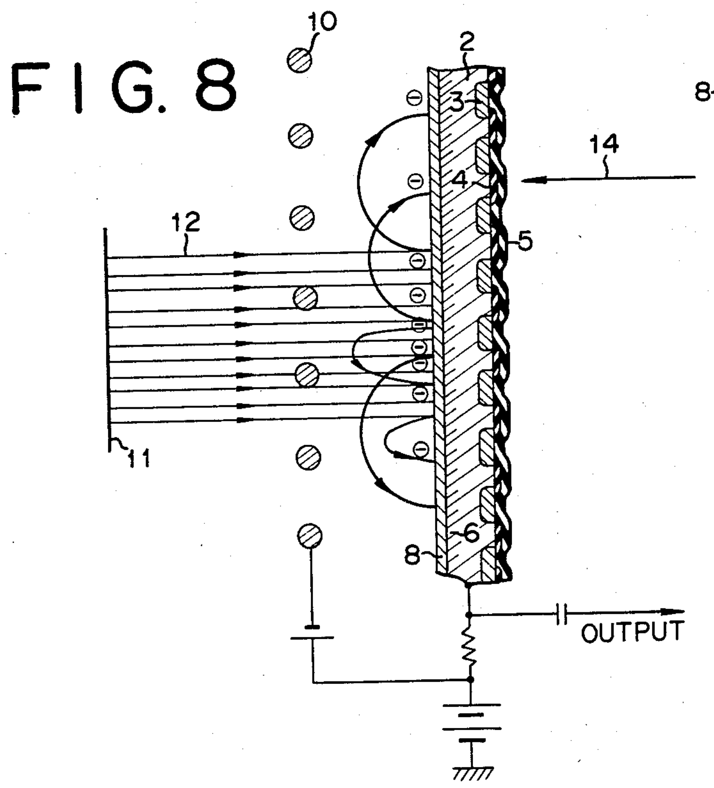
FIG. 8 is a schematic view showing a modification of the target construction shown in FIG. 7A.

As the resistivity of the thin film 7 is slightly lower than that of the semi-insulating film 8, the negative charge appearing on the interface between the semi-insulating film 8 and the semiconductor substrate 2 in the vicinity of a portion corresponding to a highly bright object in the scene creeps or migrates laterally along the aforesaid interface toward the portion corresponding to the brighter object, as is indicated by dashed line in FIG. 7B. As a result, the neighboring portions around the portion corresponding to the brighter objects are subject to a field effect owing to the migrated negative charge. Thus, not only in the portion corresponding to the brighter object but also in the neighboring portions therearound the motion of holes toward the scanning side of the target is repressed, so that the effective sensitivity for these portions is reduced. By way of example, with an input of a pattern as indicated by solid line in FIG. 7B, the output waveform will be as shown in FIG. 7C. This means that the darkness is emphasized for portions in the immediate vicinity of a brighter portion. As the portions in the immediate vicinity of the brighter portions, which are likely to give rise to halation, are rendered still darker, the boundary between the darker and lighter portions becomes more distinct, and pictures of excellent contrast will be obtained. The re-distribution of the negative charge on the interface between the semi-insulating film 8 and the semiconductor substrate 2 may also be brought about by means of a screen or meshed conductor 10 facing the input side of the target and held at a negative potential with respect to the potential of the target, as shown in FIG. 8. This screen 10 consists of, for example, a copper screen having 500 meshes per square inch. With this arrangement, secondary electrons emitted by the bombardment of the target with primary photons are returned to and re-distributed on the target owing to the negative potential on the screen 10. The condition of re-distribution is largely affected by the different potentials of the meshed screen and target as well as by the distance therebetween.

Figure 9:
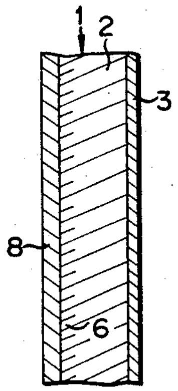

In the foregoing embodiments, a diode array consisting of a plurality of p-n junctions as the charge-storing elements is formed on the scanning side of the target. The invention may also be applied to targets of other constructions. FIG. 9 shows such an example of target, which has a continuous film 3 mainly consisting of, for example, yttrium oxide or zinc sulfide etc., formed on the n-type silicon substrate. In this example, the charge-storing action is attained with the hetero-junction between the substrate 2 and the film 3, and similar effects may be attained in this embodiment by providing the semi-insulating layer 8 on the substrate 2 on the input side thereof.

Figure 10:
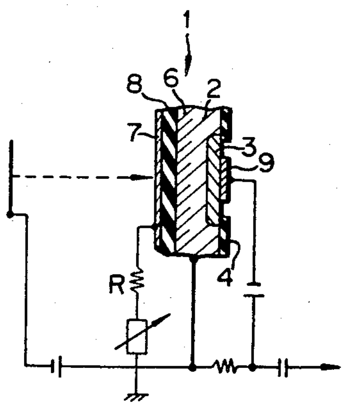
FIG. 10 is a schematic sectional view of another embodiment of the photosensitive device applied to the target according to the invention.

Also, though the foregoing embodiments have concerned with apparatus for obtaining picture signals (such as television camera tube), the invention may of course be applied to photo-multiplier devices to amplify photoelectron current without carrying two-dimensional information, which provide a knee-point in the input-output characteristic. FIG. 10 shows an example of such a device, which comprises an n-type silicon substrate 2 formed with a p-type region 3 forming a single p-n junction with the p-type region 3 on one side and an $n^+$-type layer by the diffusion of phosphorus on the other side and having one principal surface provided with an oxide protection film 4 and an electrode 9 and the other principal surface provided with a semi-insulating film 8 about 100 angstroms in thickness which is formed by depositing a material having an extremely high resistivity, such as magnesium fluoride ($MgF_2$), and on which is formed an aluminum film 7 about 100 angstroms in thickness. The aluminum film 7 is biased through a bias resistor providing a high impedance R. Similar to the preceding embodiments, the aluminum film 7 is charged in accordance with the input amount to cause a field effect in the substrate 2, so that a desired input-output characteristic may be obtained. The time constant for the circuit involving the aluminum film 7 and the high impedance R may be suitably preset such that the charging and discharging of the aluminum film 7 follows the variation of the input. This embodiment has an advantage that the operating point for the variation of the charge on the aluminum film 7 may be selected by appropriately adjusting the bias voltage.

Figure 11:
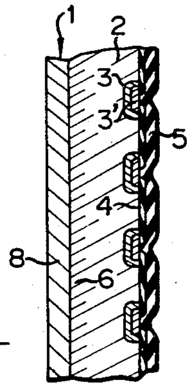

Although the foregoing embodiments have used silicon as the substrate material, other semi-conductors such as germanium, gallium arsenide, cadmium sulfide and cadmium selenide may be used as well. Also, in place of the diode construction employed in the foregoing embodiments to store the input signal, other constructions such as transistor construction (n-p-n construction) and n-i-p construction shown in FIG. 11 may be utilized as well. The foregoing description of an n-type substrate holds true with a p-type substrate. Further, the charging of the semi-insulating film may be caused by utilizing other phenomena than the secondary emission, for example EBIC (electron bombardment induced conductivity) effect, photoelectron emission using portion of input light, photoconductivity phenomenon and so forth.

Further, although the above embodiments have concerned with photoelectrons to produce the input signal, the invention is applied to other types of source of incidence on the target, such as direct light, x-radiation, γ-radiation and the like. Moreover, the beam scan method of deriving the output signal may be replaced with the one using the so-called "All Solid State Scanner Circuit System."

As has been described in the foregoing, according to the invention it is possible to provide a photosensitive semiconductor device, where the input-output photoelectric conversion characteristic is controlled by the charging of the incident face, on which energetic particles such as, light, photon rays or photoelectrons are incident.

What we claim is:

1. A semiconductor device sensitive to incident energetic particles, comprising a semi-conductor substrate having a first major surface wherein said substrate is formed of a first material having one conductivity type and a second material of a second conductivity type extending into said first material from said major surface, a pn junction formed therebetween; means for reverse biasing said junction; and a second major surface opposite to said first major surface, the second major surface adapted to be impinged by said incident energetic particles, characterized by a thin layer of a semi-insulating material covering said substrate on said second major surface, said semi-insulating material having a resistivity of the order of $10^5$ to $10^{12}$ ohm-cm, and being one selected from the group consisting of a mixture of yttrium oxide and titanuim oxide, caduim telluride, arsenic sulfide and antimony sulfide, said thin layer of semi-insulating material having a predetermined time constant and being charged and discharged as a function of the amount of incident energetic particles.

2. A semi-conductor device according to claim 1 further including means for re-distributing the charge built up on said thin layer of the semi-insulating material laterally along the surface thereof.

3. A semi-conductor device according to claim 1, wherein said thin layer of semi-insulating material is a continuous thin layer having a uniform thickness.

4. A semi-conductor device according to claim 1, wherein said thin layer of semi-insulating material is divided into a large number of islands.

5. A semi-conductor device according to claim 1, wherein said thin layer of semi-insulating material is a mesh formation.

6. A semi-conductor device according to claim 1, wherein said thin layer of semi-insulating material is coated with a second thin layer having a higher resistance in the lateral direction of the surface than the first thin layer.

7. A semi-conductor device according to claim 6, wherein said second thin layer is formed of a material selected from the group consisting of porous zinc sulfide, porous arsenic sulfide and porous antimony sulfide.

8. A semi-conductor device according to claim 6, wherein said second thin layer is comprised of a large number of thin metal layers separated into islands.

* * * * *